March 23, 1926.
A. L. COLE
1,577,788
PERMANENT TRAILING COUPLING
Filed March 24, 1925
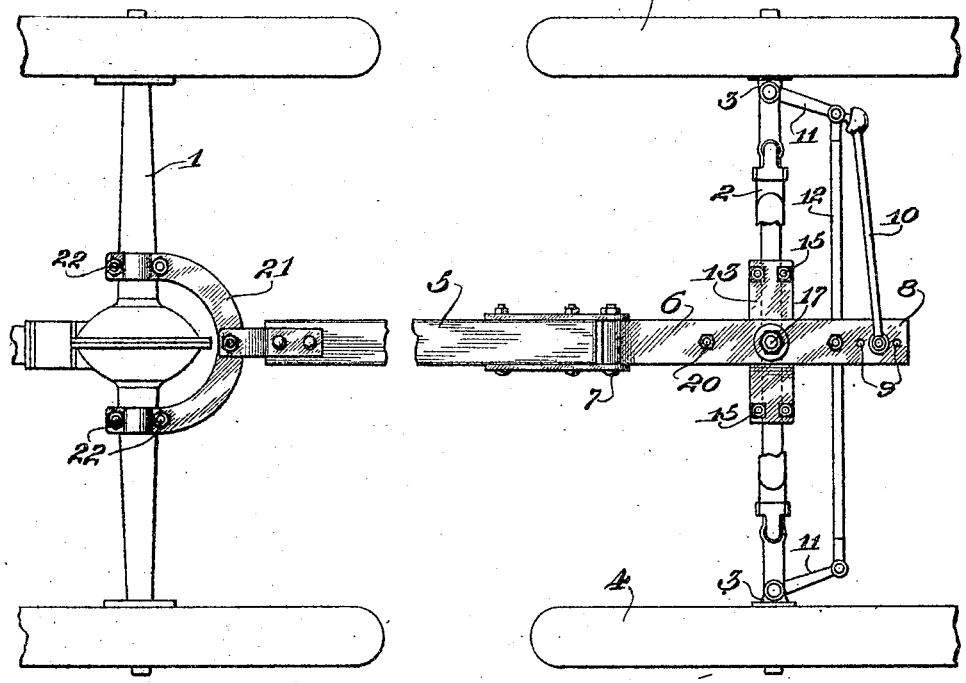
Fig. 1.
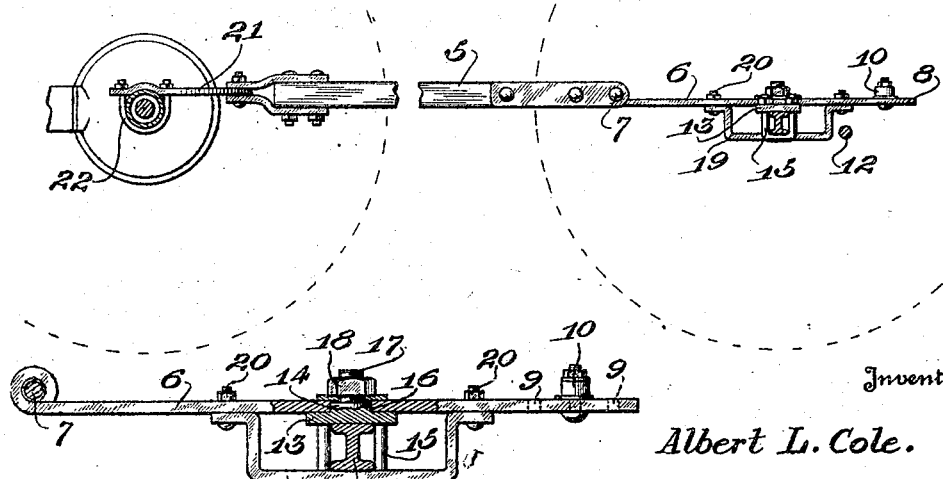
Fig. 2.
Fig. 3.
Inventor
Albert L. Cole.
By Eccleston & Eccleston.
Attorneys Patented Mar. 23, 1926.

1,577,788

UNITED STATES PATENT OFFICE.

ALBERT L. COLE, OF ANSON, TEXAS.

PERMANENT TRAILING COUPLING.

Application filed March 24, 1925. Serial No. 18,015.

*To all whom it may concern:*

Be it known that I, ALBERT L. COLE, a citizen of the United States, residing at Anson, in the county of Jones and State of Texas, have invented certain new and useful Improvements in Permanent Trailing Couplings, of which the following is a full, clear, and exact description.

This invention relates to towing and steering devices for automobiles and the like, and has for its object to provide a draw bar or single-tree analogous to that found on wagons and which is permanently mounted on the automobile being towed and so connected with the ordinary steering mechanism of the automobile as to form a guiding means therefor.

Many devices have been devised for towing and steering a temporarily disabled automobile without the use of an operator in the automobile being towed. Such devices however are only intended to be detachably connected to the vehicle being towed and are in practice carried around as a part of the outfit of a repair wagon of a garage and the like. The present invention however has reference to old and worn out automobiles which have been discarded as such, and has for its object to recondition or adapt such vehicles for use as trailers on farms and the like.

To this end it is an object of the present invention to provide a permanent and reliable mounting by which the draw bar or single-tree may be pivotally connected to the front axle of the trailer so as to operate the steering mechanism.

Other objects and advantages of the invention will be apparent from the following description when taken in connection with the accompanying drawings, in which:

Figure 1 is a plan view, parts broken away, showing my novel towing mechanism attached to the rear axle of the towing vehicle and the front axle of the vehicle being towed.

Figure 2 is a side elevation partly broken away, parts being shown in section; and Figure 3 is an enlarged side elevation of a detail, parts being broken away to more clearly show the construction.

Referring to the drawings more in detail, the numeral 1 designates the usual rear axle of an automobile to which may be applied the towing apparatus, while numeral 2 designates the front axle of the vehicle being towed and which is provided with stub axles 3 on which the front wheels 4 of the vehicle are mounted.

As hereinbefore stated, the mechanism about to be described is intended to be applied to automobiles which have become useless for their intended purpose and are to be reconditioned or converted into trailers. It is therefore intended that the draw bar or single-tree 5 be permanently connected to the front axle 2 of the trailer and so connected with the steering mechanism as to cause the front wheels to turn in the same direction as the wheels of the towing vehicle. To this end the lever 6 which may be considered as a part of the draw bar 5 and which is pivotally connected thereto, as indicated by the numeral 7, is pivoted to the front axle intermediate its ends so as to provide a rearward extension 8. This extension is provided with a plurality of perforations 9 which provide connection for the rod 10 which forms a part of the usual steering mechanism of automobiles, and which may connect with one of the steering knuckles 11 or the tie-rod 12 which is connected to these knuckles and causes them to move in unison.

It is necessary, of course, that the lever portion 6 of the draw bar be pivotally connected to the front axle 2 and at the same time be so mounted as to withstand the strains placed thereon when the vehicle is loaded and being towed. Accordingly, I have provided the mechanism now to be described which permanently clamps this lever to the front axle so as to permit it to move about a pivot point and yet which is of durable construction so as to withstand all strains which must necessarily be transmitted to it. Specifically, this structure comprises a plate 13 which may be mounted either above or below the axle, but preferably above, and which carries a cylindrical boss 14 at a central point thereon. This plate is mounted intermediate the ends of the axle 2 and is rigidly clamped thereon by a plurality of U-bolts 15 which encircle the axle and are bolted to the upper surface of the plate 13.

The lever 6 hereinbefore referred to and which forms a part of the draw bar 5, is apertured as indicated by numeral 16 so as to receive the boss 14 when the lever is placed in position upon the plate 13. This boss 14 is provided with a threaded extension 17 for the reception of a nut 18 which assists in holding the lever in engagement with the plate 13 as well as in cooperative relation with the boss 14. Obviously considerable strain is put on this portion of the apparatus and in order to reinforce this particular part of the mechanism I have provided a U-shaped strap or yoke 19 which engages the under surface of the front axle 2 and is bolted directly to the under side of the lever 6 as indicated by numerals 20.

The front end of the single-tree or draw bar 5 is pivotally connected to a yoke 21 which may be detachably connected to the rear axle of the towing vehicle by means of U-bolts 22, as clearly indicated in Figures 1 and 2.

In the practical operation of the invention it will be understood that the mechanism hereinbefore described is permanently applied to the front axle of a discarded or worn out automobile, and it is intended as a permanent part thereof so as to convert the same into a trailer to be used in the transportation of farm products and the like. It will also be understood that while in use the draw bar is detachably connnected to the towing vehicle and while so connected the draw bar will cause the trailing vehicle to automatically follow the course of the leading vehicle. It will also be understood that by means of the special mounting of the draw bar on the front axle none of the stresses and strains required in drawing the vehicle will be transmitted to the steering mechanism.

In accordance with the patent statutes I have described what I now believe to be the best embodiment of the invention, but I do not wish to be understood thereby as limiting myself or the scope of the invention, as many changes and modifications may be made without departing from the spirit of the invention; all such I aim to include in the scope of the appended claims.

What I claim as new and desire to secure by Letters Patent is:

1. The combination with the front axle of an automobile, of a plate mounted thereon, a cylindrical boss formed on said plate, a pair of U-bolts encircling said axle and anchoring the plate thereto, a lever apertured intermediate its end to receive said boss, a strap for holding said lever in contact with said plate, and means connecting one end of said lever with the steering mechanism of the automobile.

2. The combination with the front axle of an automobile, of a plate mounted thereon, a cylindrical boss provided with a threaded extension formed on said plate, a lever apertured to receive said boss, a nut engaging said threaded extension for holding said lever in contact with said plate, a U-shaped strap attached to the under surface of the said lever and engaging said axle, means connecting one end of said lever with the steering mechanism of the automobile, and a draw bar pivoted to the other end of said lever.

ALBERT L. COLE.